United States Patent
Tsirkin et al.

(10) Patent No.: US 10,768,959 B2
(45) Date of Patent: Sep. 8, 2020

(54) VIRTUAL MACHINE MIGRATION USING MEMORY PAGE HINTS

(71) Applicant: Red Hat Israel, Ltd., Raanana (IL)

(72) Inventors: Michael Tsirkin, Raanana (IL); Uri Lublin, Raanana (IL)

(73) Assignee: RED HAT ISRAEL, LTD., Raanana (IL)

(*) Notice: Subject to any disclaimer, the term of this patent is extended or adjusted under 35 U.S.C. 154(b) by 184 days.

(21) Appl. No.: 14/950,247

(22) Filed: Nov. 24, 2015

(65) Prior Publication Data

US 2017/0147371 A1 May 25, 2017

(51) Int. Cl.
G06F 9/455 (2018.01)

(52) U.S. Cl.
CPC .. G06F 9/45558 (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,484,208 B1 * | 1/2009 | Nelson | G06F 9/45558 | 711/6 |
| 8,069,218 B1 * | 11/2011 | Tormasov | G06F 9/4856 | 709/212 |
| 8,086,821 B2 | 12/2011 | Mukherjee et al. | | |
| 8,356,120 B2 * | 1/2013 | Tsirkin | G06F 9/45558 | 710/15 |
| 8,356,149 B2 * | 1/2013 | Young | G06F 9/5016 | 711/162 |
| 8,370,560 B2 * | 2/2013 | Dow | G06F 9/5088 | 711/6 |
| 8,468,288 B2 * | 6/2013 | Corry | G06F 9/4856 | 711/170 |
| 8,671,256 B2 | 3/2014 | Dow | | |
| 8,689,211 B2 * | 4/2014 | Agbaria | G06F 9/4856 | 718/1 |
| 8,806,480 B2 | 8/2014 | Araujo, Jr. et al. | | |
| 8,904,384 B2 * | 12/2014 | Low | G06F 9/5088 | 717/148 |
| 8,984,240 B2 | 3/2015 | Aslot et al. | | |
| 9,053,068 B2 * | 6/2015 | Tsirkin | G06F 12/126 | |
| 9,081,599 B2 * | 7/2015 | Tsirkin | G06F 9/48 | |
| 9,104,459 B2 | 8/2015 | Tsirkin et al. | | |
| 9,158,578 B1 * | 10/2015 | Derbeko | G06F 12/08 | |

(Continued)

OTHER PUBLICATIONS

Clark et al. "Live Migration of Virtual Machines", $2^{nd}$ Symposium on Networked Systems Design and Implementation, 2005 (Clark_2005.pdf; pp. 1-14).*

(Continued)

*Primary Examiner* — Hiren P Patel
(74) *Attorney, Agent, or Firm* — Haynes and Boone LLP

(57) ABSTRACT

Methods, systems, and computer program products are provided for migrating memory pages. A virtual machine is run by a hypervisor. The virtual machine includes a guest that is allocated a plurality of guest memory pages. A data structure is initialized corresponding to a memory page of the plurality of guest memory pages. A first status is assigned in the data structure to the memory page. The memory page is migrated to a destination and the data structure is modified to assign the memory page a second status.

17 Claims, 4 Drawing Sheets

(56) References Cited

U.S. PATENT DOCUMENTS

| | | | | |
|---|---|---|---|---|
| 9,223,616 | B2* | 12/2015 | Tsirkin | G06F 9/5077 |
| 9,348,655 | B1* | 5/2016 | Tsirkin | G06F 9/5088 |
| 9,389,899 | B2* | 7/2016 | Tsirkin | G06F 9/45558 |
| 9,507,626 | B1* | 11/2016 | Tsirkin | G06F 11/1464 |
| 9,552,233 | B1* | 1/2017 | Tsirkin | G06F 9/5088 |
| 9,672,052 | B1* | 6/2017 | Berreth | G06F 9/544 |
| 9,672,054 | B1* | 6/2017 | Gupta | G06F 9/45533 |
| 9,727,368 | B1* | 8/2017 | Tsirkin | G06F 9/45558 |
| 9,779,015 | B1* | 10/2017 | Oikarinen | G06F 12/02 |
| 9,785,378 | B2* | 10/2017 | Tsirkin | G06F 3/0655 |
| 9,851,918 | B2* | 12/2017 | Tsirkin | G06F 3/0647 |
| 9,934,056 | B2* | 4/2018 | Noel | G06F 9/45558 |
| 10,521,256 | B2* | 12/2019 | Tsirkin | G06F 12/0866 |
| 2009/0063749 | A1 | 3/2009 | Dow | |
| 2009/0063752 | A1 | 3/2009 | Dow | |
| 2009/0064136 | A1* | 3/2009 | Dow | G06F 9/5077 718/1 |
| 2010/0299666 | A1* | 11/2010 | Agbaria | G06F 9/4856 718/1 |
| 2011/0010711 | A1* | 1/2011 | Patwardhan | G06F 9/4856 718/1 |
| 2011/0082962 | A1* | 4/2011 | Horovitz | G06F 11/301 711/6 |
| 2011/0107044 | A1* | 5/2011 | Young | G06F 9/5016 711/162 |
| 2011/0145471 | A1* | 6/2011 | Corry | G06F 9/4856 711/6 |
| 2011/0167195 | A1* | 7/2011 | Scales | G06F 9/45558 711/6 |
| 2011/0264788 | A1* | 10/2011 | Costa | G06F 9/4856 709/224 |
| 2012/0011508 | A1* | 1/2012 | Ahmad | G06F 12/1009 718/1 |
| 2012/0017031 | A1* | 1/2012 | Mashtizadeh | G06F 9/45558 711/6 |
| 2012/0054367 | A1* | 3/2012 | Ramakrishnan | G06F 9/4856 709/242 |
| 2012/0137098 | A1* | 5/2012 | Wang | G06F 3/0617 711/165 |
| 2012/0179855 | A1* | 7/2012 | Tsirkin | G06F 9/45558 711/6 |
| 2012/0180043 | A1* | 7/2012 | Tsirkin | G06F 9/455 718/1 |
| 2012/0185856 | A1* | 7/2012 | Ashihara | G06F 9/4856 718/1 |
| 2012/0221710 | A1* | 8/2012 | Tsirkin | G06F 9/4856 709/224 |
| 2012/0324443 | A1* | 12/2012 | Low | G06F 9/45504 718/1 |
| 2013/0205106 | A1* | 8/2013 | Tati | G06F 3/061 711/159 |
| 2013/0346613 | A1* | 12/2013 | Tarasuk-Levin | G06F 9/45558 709/226 |
| 2014/0013032 | A1* | 1/2014 | Min | G06F 12/0246 711/103 |
| 2014/0068207 | A1* | 3/2014 | Aslot | G06F 12/12 711/160 |
| 2014/0108854 | A1* | 4/2014 | Antony | G06F 11/203 714/4.2 |
| 2014/0244891 | A1* | 8/2014 | Tsirkin | G06F 9/5077 711/6 |
| 2014/0281674 | A1* | 9/2014 | Miyajima | G06F 11/1484 714/4.11 |
| 2014/0298333 | A1* | 10/2014 | Yoshida | G06F 9/5088 718/1 |
| 2014/0325515 | A1 | 10/2014 | Salmela et al. | |
| 2015/0007172 | A1* | 1/2015 | Hudzia | G06F 9/45533 718/1 |
| 2015/0149687 | A1* | 5/2015 | Tsirkin | G06F 12/109 711/6 |
| 2015/0212844 | A1* | 7/2015 | Tsirkin | G06F 9/45558 718/1 |
| 2015/0242159 | A1* | 8/2015 | Tsirkin | G06F 3/0647 711/162 |
| 2015/0278397 | A1* | 10/2015 | Hendrickson | G06F 16/9024 707/798 |
| 2015/0309839 | A1* | 10/2015 | Lu | G06F 9/45558 710/308 |
| 2016/0026489 | A1* | 1/2016 | Maislos | G06F 9/45558 718/1 |
| 2016/0062805 | A1* | 3/2016 | Kumar | G06F 9/5077 711/160 |
| 2016/0132443 | A1* | 5/2016 | Davda | G06F 13/28 710/308 |
| 2016/0203088 | A1* | 7/2016 | Tsirkin | G06F 9/45558 711/6 |
| 2016/0224383 | A1* | 8/2016 | Bonzini | G06F 9/5016 |
| 2016/0299773 | A1* | 10/2016 | Dong | G06F 9/45558 |
| 2017/0004001 | A1* | 1/2017 | Bacher | G06F 9/45558 |
| 2017/0090965 | A1* | 3/2017 | Tsirkin | G06F 9/45558 |
| 2017/0132028 | A1* | 5/2017 | Tsirkin | G06F 9/45558 |

OTHER PUBLICATIONS

Hines et al., "Post-Copy Based Live Virtual Machine Migration Using Adaptive Pre-Paging and Dynamic Self-Ballooning", Binghamton University, ACM Mar. 13, 2009; (Hines_2009.pdf; pp. 1-10).*

Onoue et al. "A Virtual Machine Migration System Based on a CPU Emulator", University of Toklyo, 2006 (onoue_2006.pdf: pp. 1-8).*

Akane Koto et al, "Towards Unobtrusive VM Live Migration for Cloud Computing Platforms" http://www.researchgate.net/profile/Kenji_Kono/publication/254463754_Towards_unobtrusive_VM_live_migration_for_cloud_computing_platforms/links/541169310cf264cee28b2be6.pdf, Keio University, NTT Software Innovation Center, Jul. 23-24, 2012, 7 pages.

* cited by examiner

VIRTUAL MACHINE MIGRATION USING MEMORY PAGE HINTS

FIELD OF DISCLOSURE

The present disclosure generally relates to virtualization, and more particularly to a migration of a virtual machine.

BACKGROUND

A host machine (e.g., computer or server) is typically enabled to simultaneously run one or more virtual machines using a software application known as a hypervisor. The hypervisor allocates portions of the host machine's resources to each of the virtual machines. The hypervisor virtualizes the underlying hardware of the host machine or emulates hardware devices, making the use of the virtual machine transparent to a local or remote client that uses the virtual machine. Typically, a hypervisor manages allocation and virtualization of computer resources and performs context switching, as may be necessary, to cycle between various virtual machines, such that many virtual machines may be run simultaneously.

A virtual machine is a portion of software that provides an environment allowing the virtualization of a physical computer system. Each virtual machine may function as a self-contained platform, running applications and its own operating system that is referred to as a guest or guest operating system. Guests may be accessed by clients to perform computing tasks.

Conventionally, a virtual machine running on a host machine may be migrated for reasons such as workload balancing and error recovery. A conventional migration may include a pre-copy migration, in which a hypervisor scans and copies memory corresponding to a virtual machine, which may be performed while the virtual machine is running. However, during the migration, any copied memory of the virtual machine that is modified may have to be re-copied so that the modifications may be captured at the destination. The additional copying (which may include transmitting the copied memory over a network) may cause significant slowdowns in the migration—sometimes to the extent that the migration is unable to be completed. Thus, while conventional virtual machine techniques have been generally adequate, limitations remain.

BRIEF SUMMARY

This disclosure relates to migration of a virtual machine from a source to a destination. Methods, systems, and techniques for migration of a virtual machine are provided.

According to an example, a method of migrating a virtual machine includes running a virtual machine by a hypervisor, the virtual machine including a guest that is allocated a plurality of guest memory pages; initializing a data structure corresponding to a memory page of the plurality of guest memory pages, wherein the data structure is readable by the guest and writable by the hypervisor; assigning, in the data structure, a first status to the memory page, the first status indicating that: (1) the memory page has not been migrated or (2) the memory page has been migrated and has been modified since the migration; migrating the memory page that is assigned the first status; and modifying the data structure to assign the memory page a second status, the second status indicating that the memory page has been migrated and has not been modified since the migration.

According to another example, a non-transitory machine-readable medium includes a plurality of machine-readable instructions that when executed by one or more processors are adapted to cause the one or more processors to: run a virtual machine by a hypervisor, the virtual machine including a guest that is allocated a plurality of guest memory pages; initialize a data structure corresponding to a memory page of the plurality of guest memory pages; assign, in the data structure, a first status to the memory page; migrate the memory page; and assign the memory page a second status.

According to another example, a system for migrating a virtual machine includes a processor and a memory; a data structure stored in the memory, the page hint structure to indicate migration status corresponding to a memory page of a plurality of guest memory pages; a hypervisor executed by the processor, the hypervisor to: run a virtual machine, the virtual machine including a guest that is allocated the plurality of guest memory pages, assign, in the data structure, a first status to the memory page; migrate the memory page; and assign, in the data structure, a second status to the memory page.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
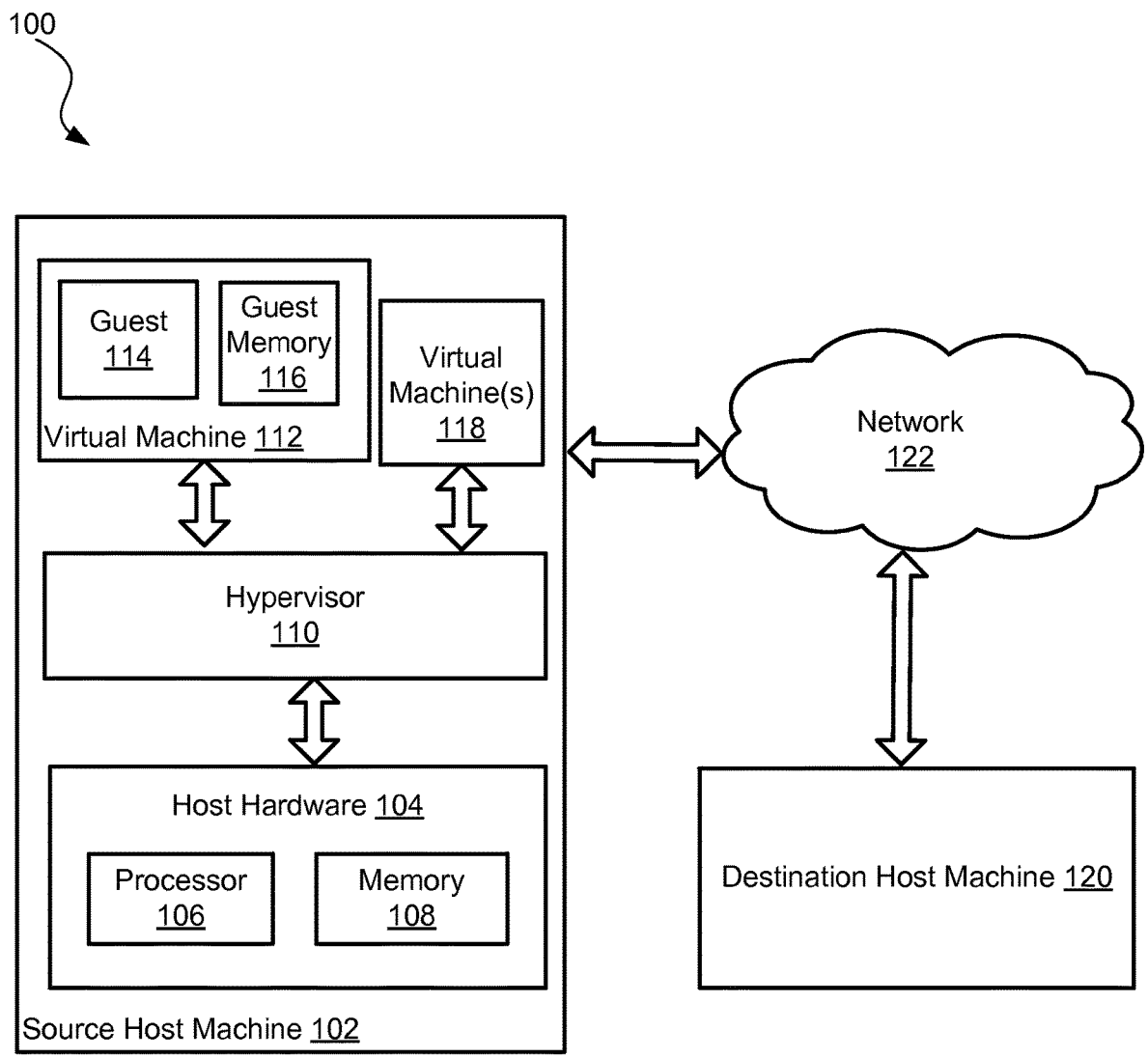
FIG. 1 is an organizational diagram illustrating a system for migrating a virtual machine, in accordance with various examples of the present disclosure.

FIG. 1 is an organizational diagram illustrating a system for migrating a virtual machine, in which various aspects of the present disclosure may be implemented.

The system 100 includes a source host machine 102. The source host machine 102 includes host hardware 104. Host hardware 104 includes physical elements such as a processor 106, memory 108, and may also include other input/output (I/O) devices, such as those illustrated in FIG. 4.

The source host machine 102 includes a hypervisor 110, which also may be referred to as a virtual machine monitor.

Hypervisor 110 may include executable instructions that are stored in the memory 108 and executed by the processor 106. Hypervisor 110 run on top of a host operating system, or may run directly on host hardware 104 without the use of a host operating system.

In the present example, hypervisor 110 provides one or more virtual machines, such as the virtual machine 112 and virtual machine(s) 118. In other examples, there may be any number of virtual machines. Each virtual machine is an underlying virtualization of source host machine 102. Each virtual machine may be, for example, a hardware emulation, full virtualization, para-virtualization, and operating system-level virtualization virtual machine. The hypervisor 110 manages system resources, including access of virtual machines (e.g., virtual machine 112 and virtual machine(s) 118) to the host hardware 104, such as processor 106, memory 108, and other hardware devices. In some examples, the system resources that may be provided to each virtual machine include a virtual CPU, guest memory, one or more virtual devices, such as a network device, an emulated NIC or disk, virtual firmware such as a Basic Input/Output System (BIOS) and/or an Extensible Firmware Interface (EFI), and so forth.

In the present example, the hypervisor 110 provides a guest 114, also called a guest operating system, that runs on the virtual machine 112. The guest 114 running on a virtual machine 112 may include a same or a different operating system as a host operating system running on the source host machine 102. Moreover, each of the virtual machine(s) 118 may also include a guest that provides a same operating system or a different operating system as the host operating system and/or the guest 114. Accordingly, the source host machine 102 may run multiple operating systems concurrently and in isolation from other programs.

The hypervisor 110 provides a guest memory 116 that is allocated to the guest 114. In the present example, the guest memory 116 and guest memories corresponding to the virtual machine(s) 118 are each a virtualized portion of the memory 108 that is mapped to the memory 108 via one or more mappings, such as page tables. Each guest memory may include one or more guest memory pages that are each assigned a portion of the address space assigned to the guest memory 116. The guest memory pages may be fully or partially controlled by the guest 114. For example, the guest 114 may allocate memory pages from the guest memory 116 to run processes and execute applications on the virtual machine 112.

The hypervisor 110 is structured to migrate a virtual machine, such as virtual machine 112, to another virtual machine located on the source host machine (e.g., to a virtual machine of virtual machine(s) 118) and/or to a virtual machine on another host machine (e.g., destination host machine 120) via a network 122. The hypervisor 110 may be structured to migrate virtual machines to perform maintenance on the source host machine 102, take advantage of a particular feature of another host machine (e.g., destination host machine 120), balance host workloads, recover from faults, and so forth.

In some examples, the hypervisor 110 is structured to migrate a virtual machine (e.g., virtual machine 112) by performing a pre-copy migration technique that includes copying memory pages from the guest memory (e.g., guest memory 116) of the virtual machine 112 to a destination. The destination may be, for example, another virtual machine (e.g., one of the virtual machine(s) 118) on the source host machine 102 and/or a virtual machine on another host machine (e.g., destination host machine 120). In some examples, destination host machine 120 is structured similarly in some respects to the source host machine 102, and includes host hardware, a hypervisor, and one or more virtual machines.

The hypervisor 110 is structured to provide a memory page hint data structure that is a data structure that indicates migration status corresponding to memory pages. The memory page data hint structure is provided by the hypervisor to the guest of the virtual machine that is being migrated. The hypervisor 110 may provide a memory page hint data structure corresponding to each virtual machine that is migrated. For example, to migrate virtual machine 112, the hypervisor 110 is structured to provide a memory page hint data structure to the guest 114. In this example, the memory page hint data structure is structured to be readable by the guest 114 and writable by the hypervisor 110. In some examples, the memory page hint data structure is stored in the guest memory 116. In other examples, the memory page hint data structure may be stored in another address space that is not included in the guest memory. For example, the hypervisor 110 may store the memory page hint data structure in a memory that is allocated to the hypervisor 110 and is not included in the guest memory 116.

In some examples, the memory page hint data structure includes an entry corresponding to each of one or more memory pages of the guest memory 116. The one or more memory pages may include all or a portion of the memory pages of the guest memory 116. In some examples, the memory page hint data structure is structured as a bitmap that includes one or more bits corresponding to each memory page of the one or more memory pages. Other data structures such as one or more tables, linked lists, and so forth may also be used instead of or in addition to a bitmap. Each entry in the memory page hint data structure may be structured to include a data value that has a size of a bit, byte, or other length. The memory page hint data structure may be any data structure that may indicate a migration status of a memory page. Migration status (e.g., migrated or non-migrated) of a memory page may be indicated by one or more data values, or any other indicator that may be provided by the data structure. Moreover, the data structure may include one or more other data structures.

In the present example, the hypervisor 110 is structured to set the data values in the entries of the memory page hint data structure based on migration status of the memory pages. For example, the entries corresponding to each of the guest memory pages may be initialized to a non-migrated status. As, or after, the memory pages are migrated from the guest memory 116 by the hypervisor 110, the hypervisor 110 is structured to modify the entries of the migrated memory pages to a migrated status to indicate the memory pages that have been migrated. In some examples, in addition to modifying the entries in the memory page data structure, the hypervisor 110 may additionally be structured to provide a separate notification to the guest 114 regarding the status of the memory pages.

The guest 114 is structured to read the migration status indicators in the memory page hint data structure to select memory pages for allocation from the pool of non-migrated pages. These non-migrated pages may be identified by the guest 114 based on the non-migrated status assigned in the memory page hint data structure. Modifying memory pages after they have been migrated may cause the hypervisor 110 to migrate the memory pages again to capture the modifications at the destination, which may slow down the migration. Accordingly, by providing an indication from the hypervisor 110 to the guest 114 regarding migrated and non-migrated memory pages, the guest 114 may select non-migrated memory pages and/or perform other operations to increase the efficiency of the migration. Accordingly, the hypervisor 110 and guest 114 are structured to provide a useful improvement to conventional migration techniques.

In another example, the hypervisor 110 may be structured to scan and migrate the memory pages of the guest memory 116 in an order. For example, the hypervisor 110 may be structured to start the scan at a starting address of the guest memory 116, scan the memory pages in a sequential order, and migrate each memory page in the scanned order. In this example, the memory page hint data structure may be structured to include an entry that stores an address corresponding to a last migrated page. Thus, the guest 114 may be provided an indication in the memory page hint data structure that pages prior to the address in the sequential order have been migrated, such that the guest 114 may select memory pages from a pool of non-migrated memory pages that are located after the address in the sequential order.

Figure 2:
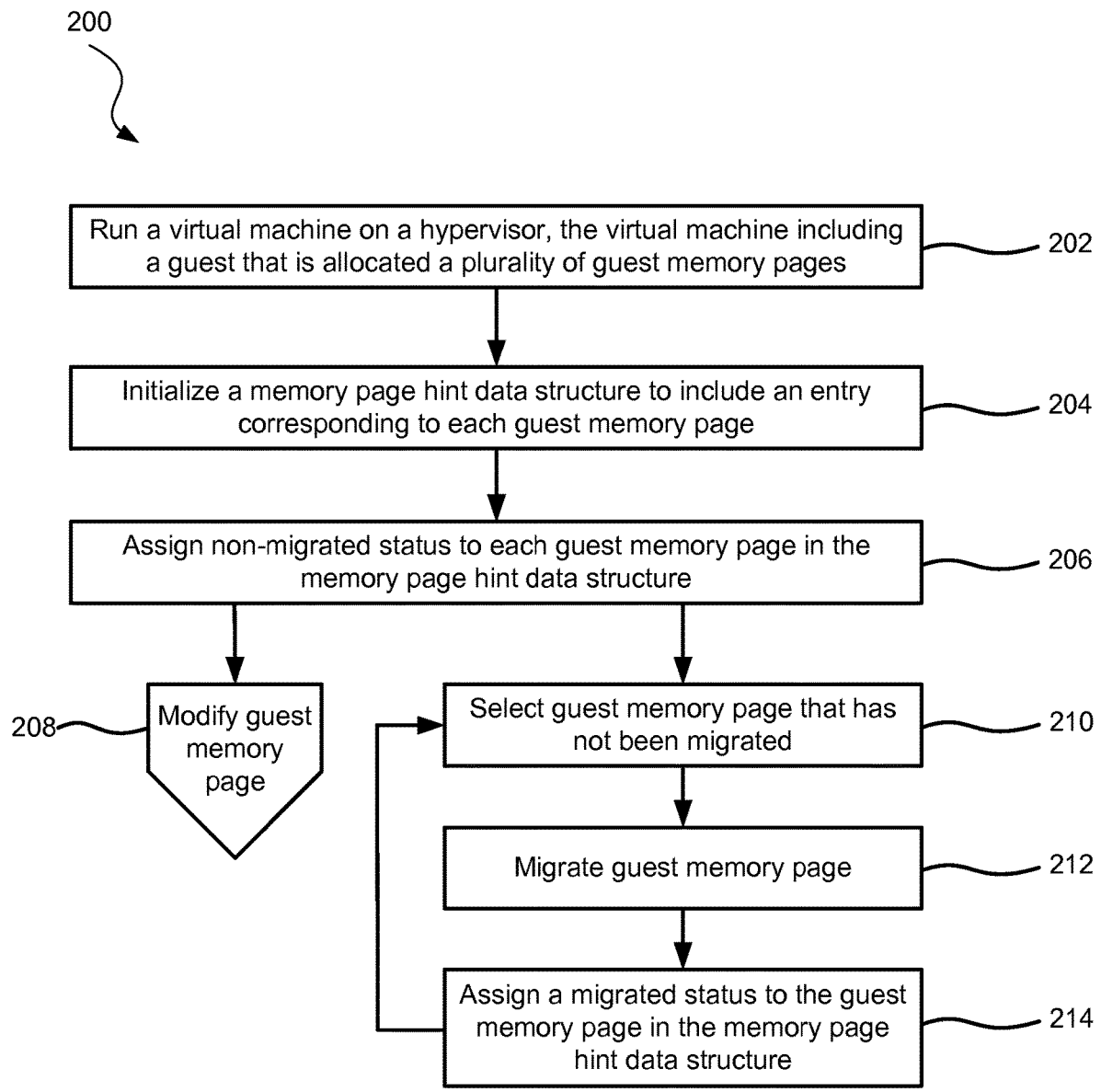
FIG. 2 is a flow diagram illustrating migration of a virtual machine, in accordance with various examples of the present disclosure.
Figure 3:
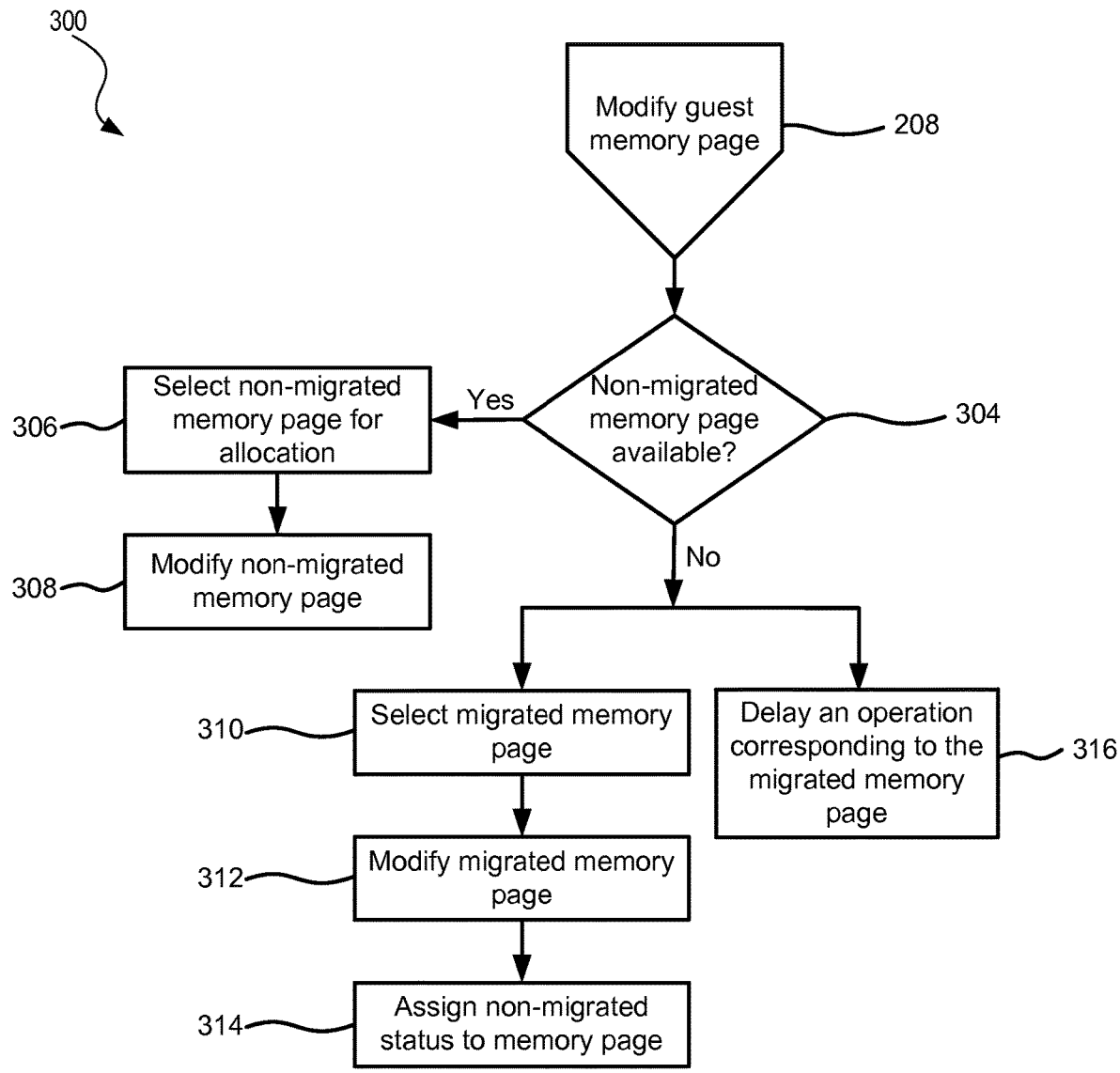
FIG. 3 is a flow diagram illustrating modification of a guest memory page, in accordance with various examples of the present disclosure.

Techniques for migrating virtual machines are discussed in more detail with respect to FIG. 2 and FIG. 3.

FIG. 2 is a flow diagram illustrating migration of a virtual machine, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method 200 is performed by a virtual environment that is provided by the system 100 illustrated in FIG. 1. For example, the method 200 may be performed on the source host machine 102. In some examples, the order of the actions described below may also be performed according to alternative orderings. In yet other examples, additional actions may be added and actions that are described may be removed.

At action 202, the hypervisor runs a virtual machine. The virtual machine is structured by the hypervisor to include a guest memory that is divided into a plurality of guest memory pages. The hypervisor runs a guest on the virtual machine and allocates at least a portion of the guest memory pages to the guest. From these guest memory pages allocated by the hypervisor, the guest may select and allocate memory pages to perform read, write, and execute operations. Further, the guest may allocate memory pages to other applications running on the guest and/or virtual machine, such that the other applications may perform read, write, and execute operations.

At action 204, the hypervisor initializes a memory page hint data structure with one or more entries corresponding to the guest memory pages. In some examples, the initializing of the memory page hint data structure includes creating the memory page hint data structure. In some examples, the memory page hint data structure is initialized when a virtual machine is created. In other examples, the memory page hint data structure is initialized when a migration is triggered.

In some examples, initializating the memory page hint data structure includes creating one or more entries corresponding to memory pages of the guest memory. For example, a first entry may be created in the memory page hint data structure corresponding to a memory page of the guest memory pages. Other entries may be created in the memory page hint data structure for each of the other memory pages of the guest memory pages. Entries may be created for all or a portion of the guest memory pages.

In some examples, the memory page hint data structure is configured as a bitmap that includes one or more bits that identify a migration status of each of the guest memory pages. In other examples, the memory page hint data structure is configured to store an address of a last migrated memory page, such that in an ordered memory page migration the guest may identify memory pages that are at or prior to the address as having a migrated status, and memory pages after the address as having a non-migrated status. Migration status and non-migration status may be each indicated by various different data values and data structures, and are not limited to the examples described above.

At action 206, the hypervisor assigns each of one or more guest memory pages a non-migrated status in the memory page hint data structure. The assigning of the non-migrated status to each of the one or more guest memory pages may be performed by modifying the entries in the memory page hint data structure corresponding to the guest memory pages to include the non-migrated status. In some examples, the non-migrated status of a guest memory page is indicated by a particular data value that is set in the entry of the memory page hint data structure that corresponds to the guest memory page. In other examples, the assigning of the non-migrated status to each guest memory page is performed during the initialization by setting each entry in the memory page hint data structure to default to the non-migrated status indicator.

In the present example, the non-migrated status indicates that (1) the memory page has not been migrated or (2) the memory page has been migrated and has been modified since the migration. For example, if a memory page is modified after its migration, the modified memory page will include at least some data that has not been migrated. Accordingly, the modified memory page may be assigned the non-migrated status because the modified memory page includes at least some non-migrated data.

At action 208, the guest modifies one or more memory pages of the guest memory pages. This action is described in further detail with respect to FIG. 3.

Actions 210, 212, and 214 may be performed in parallel or sequential with action 208, such that memory pages are modified by the guest in action 208 during the migration process performed by the hypervisor in steps 210, 212, and 214.

At action 210, the hypervisor selects one or more memory pages of the guest memory pages that have not been migrated. In some examples, the memory pages may be scanned and selected for migration in a defined order, which may be a sequential memory page ordering. In other examples, the hypervisor may select memory pages for migration according to another ordering and/or based on other criteria.

At action 212, the hypervisor migrates the selected guest memory pages. In some examples, the selected memory pages are copied to another location on a source host machine, such as a guest memory corresponding to another virtual machine. In other examples, the selected memory pages are copied to a portion of a hypervisor memory. In yet other examples, the selected guest memory pages may be transmitted to another host machine, such as by sending the guest memory pages to a hypervisor of a destination host machine via a network. In some examples, the hypervisor on the destination host machine configures a virtual machine to receive the guest memory pages from the source host machine, such that a virtual machine running on the source host machine may be migrated and run on the destination virtual machine.

At action 214, for the migrated guest memory pages, the hypervisor modifies the memory page hint data structure to indicate that the migrated guest memory pages have a migrated status. For example, each migrated guest memory page may be assigned a migrated status in the memory page hint data structure. In some examples, each entry in the memory page hint data structure that corresponds to a migrated guest memory page is modified to include the migrated status. The migrated status may include, for example, a data value in an entry of the memory page hint data structure that indicates that the guest memory page has been migrated. In other examples, the memory page hint data structure is modified to identify a last migrated memory page, such that in an ordered migration the guest may determine that pages at and prior to the last migrated memory page have been migrated and pages after the last migrated page have not been migrated.

In some examples, the hypervisor modifies the memory page hint data structure to indicate that the migrated guest memory pages have a migrated status after the migrated guest memory pages are migrated. However, in other examples, the hypervisor may detect which guest memory pages are to be migrated prior to actually migrating the guest memory pages. In these other examples, the hypervisor may modify the memory page hint data structure to indicate that the guest memory pages have a migrated status prior to or as the guest memory pages are migrated. Accordingly, the assigning of the migrated status to the guest memory page to indicate that the guest memory page is migrated may occur at, prior to, or after the migration of the guest memory page.

In some examples, the hypervisor notifies the guest that the memory page hint data structure has been modified via a signal. In other examples, the modifying of the memory page hint data structure to update the migration status is considered to be the notifying.

FIG. 3 is a flow diagram illustrating modification of a guest memory page, in accordance with various examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method 300 is performed by the system 100 illustrated in FIG. 1. For example, the method 300 may be performed on the source host machine 102. In some examples, the order of the actions described below may also be performed according to alternative orderings. In yet other examples, additional actions may be added and actions that are described may be removed.

In the present example, action 208 that is illustrated in FIG. 2 is discussed in further detail with respect to actions 304, 306, 308, 310, 312, 314, and 316 that are illustrated in FIG. 3.

As illustrated in FIG. 2, action 208 may occur after one or more guest memory pages are assigned a non-migrated status. At action 208, the guest determines that one or more guest memory pages are to be modified. In some examples, the determination is triggered based on the guest processing a request to write data to one or more guest memory pages. In some examples, the hypervisor notifies the guest when a migration is started, such that the guest is triggered to perform the steps described below when allocating memory pages during the migration. In some examples, the hypervisor may also notify the guest when the migration is complete, so that the guest may then allocate memory pages without performing the steps described with respect to FIG. 3.

At action 304, the guest determines whether there is a non-migrated memory page available. For example, the guest may read entries from the memory page hint data structure to identify a pool of memory pages that are assigned a non-migrated status. The determination may also include determining whether there are multiple non-migrated pages available. For example, the determining whether the non-migrated memory pages are available may be based on a size of data that is to be written in the guest memory. For example, if a request is processed to write data having a particular length, the guest may determine whether there are a number of non-migrated memory pages available corresponding to the particular length. If the data will fit on one memory page, the guest may determine whether there is at least one non-migrated page available. If the non-migrated memory page(s) are available, the method continues at action 306.

At action 306, the guest selects one or more memory pages that are assigned the non-migrated status. These memory pages may be allocated by the guest for performing a particular task/process.

At action 308, the one or more non-migrated memory pages are modified. For example, data may be written into the memory pages corresponding to the particular process for which the memory pages are allocated. The data may include, for example, code segments (such as executable instructions) and/or data segments (non-executable data).

Action 310 or action 316 may be performed when the guest determines that there is not a non-migrated memory page available. For example, a guest may attempt to allocate one or more memory pages for a particular task/process. If there are an insufficient amount of memory pages that are assigned a non-migrated status available, the method may continue at action 310 or action 316. In some examples, the determination for whether the guest performs action 310 or action 316 is configured by the hypervisor prior to the migration based on a user or developer preference. In other examples, the guest may select action 310 or action 316 based on pre-defined criteria configured by the hypervisor. Accordingly, in some examples, action 310 is performed when non-migrated memory pages are not available, and in other examples action 316 is performed when non-migrated memory pages are not available.

At action 310, the guest selects one or more memory pages that are assigned a migrated status in the memory page hint data structure. The migrated status indicates that the one or more memory pages have been migrated. The guest allocates the one or more memory pages for performing a particular task/process. The amount of memory pages allocated may depend on a size of data. In some examples, if there are some non-migrated memory pages available, the guest may select non-migrated memory pages to the extent possible, and select migrated memory pages to the extent that the non-migrated memory pages are not available. Accordingly, the memory pages selected and allocated may include a combination of migrated and non-migrated memory pages.

At action 312, the guest modifies the one or more migrated memory pages. For example, data may be written into the memory pages corresponding to the particular process for which the memory pages are allocated. The data may include, for example, code segments (such as executable instructions) and/or data segments (non-executable data).

At action 314, the hypervisor detects the modification of the migrated one or more memory pages. In some examples, the detecting includes detecting a guest write operation, a page fault, a privileged operation, a notification from the guest, and/or some other means. In some examples, the guest provides the hypervisor with one or more memory addresses corresponding to the modified pages. The hypervisor modifies one or more entries of the memory page hint data structure to assign the one or more memory pages the non-migrated status, which indicates that the one or more memory pages include data that has not yet been migrated. Accordingly, for additional memory page allocation requests, the one or more memory pages may be included in a pool of non-migrated memory pages that may be selected for allocation by the guest.

In some examples, the hypervisor detects that the migrated memory page is to be modified, before the migrated memory page is actually modified. For example, the hypervisor may detect a page fault corresponding to the migrated memory page, which may be triggered prior to an allocation or a write of the migrated memory page. Accordingly, the hypervisor may assign the non-migrated status to the migrated memory page prior to, during, or after the modification of the migrated memory page.

In the alternative, at action 316, the guest may delay an operation corresponding to the migrated memory page. For example, the guest may delay allocation of the migrated memory page and/or a write to the migrated memory page. In some examples, a non-migrated memory page may not be available because the hypervisor is nearing completion of the migration process. Accordingly, by delaying, the guest may provide the hypervisor with an amount of time that the hypervisor may use to complete the process. In some examples, the delay is for a pre-configured amount of time that may be configured by a user. In other examples, the hypervisor may determine a page transfer speed, such as by identifying a number of pages transferred in an amount of time and/or determining a transfer time per page. The delay may be configured by the hypervisor to an amount of time that is equal to or greater than the transfer time per page.

In some examples, the guest may check a migration status of guest memory pages and delay operations to guest memory pages that are allocated. For example, the guest may allocate a guest memory page, check the migration status of the guest memory page, and delay a memory page write operation corresponding to the guest memory page when the guest memory page is assigned a migrated status. This delay feature may also be implemented, for example, in step 308, such that the guest may check a migration status for a guest memory page that was allocated in step 306, to confirm that the guest memory page has the non-migrated status prior to performing an operation such as a write. The guest may then implement the delay in step 308, prior to modifying the guest memory page, if the guest memory page is indicated to be assigned the migrated status.

In some examples, after the delay, the method continues at step 304, by the guest again attempting to select one or more non-migrated memory pages. In other examples, the delay results in the processing of the guest to be halted so that the migration may be completed without further modification to the guest's memory pages. In yet other examples, after the delay the method may proceed at step 310 to have the guest allocate a migrated memory page. After or before allocating a migrated memory page, the guest may notify the hypervisor that the guest is allocating or has allocated a migrated memory page and provide the identity of the memory page to the hypervisor.

Figure 4:
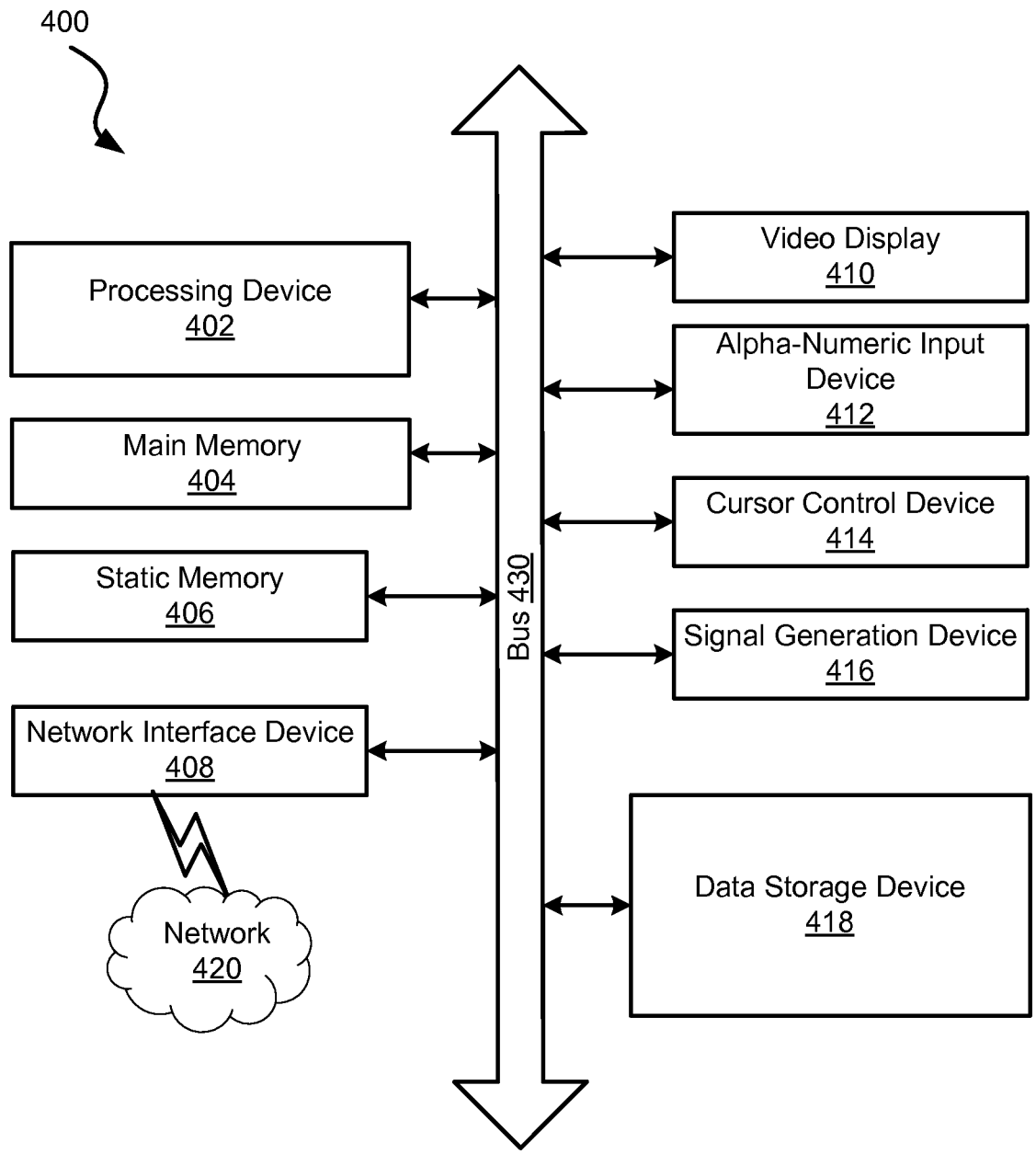
FIG. 4 is an organizational diagram illustrating a computing system suitable for implementing one or more examples of the present disclosure, in accordance with various examples of the present disclosure.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 102 that executes computer-readable instructions to provide a hypervisor 110, virtual machine 112, and virtual machine(s) 118. The computer system 400 may also provide structure for implementing the destination host machine 120 that is also illustrated in FIG. 1.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 110 may include any combination of public and/or private networks. The network 110 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for migrating memory pages, the method comprising:
running a virtual machine by a hypervisor, the virtual machine including a guest that is allocated a plurality of guest memory pages;
initializing a data structure corresponding to a memory page of the plurality of guest memory pages, wherein the data structure is readable by the guest and writable by the hypervisor;
assigning the memory page a first status in the data structure, the first status indicating that the memory page has not been migrated;
migrating the memory page that is assigned the first status;
assigning the memory page a second status in the data structure, the second status indicating that the memory page has been migrated and has not been modified since the migration;
receiving a notification that a migration has started;
determining that at least one memory page of the plurality of guest memory pages is to be modified, wherein the determining is triggered by a request to write data to the at least one memory page;
in response to determining that the at least one memory page of the plurality of guest memory pages has the first status indicating that the at least one memory page of the plurality of guest memory pages has not been migrated, modifying the at least one memory page of the plurality of guest memory pages that has the first status, wherein the determining is based on a size of data that is to be written into the plurality of guest memory pages; and
notifying the guest via a signal that the data structure has been modified.

2. The method of claim 1, the method further comprising:
selecting, by the guest, one or more memory pages of the plurality of guest memory pages that are assigned the first status; and
modifying the one or more memory pages.

3. The method of claim 1, further comprising:
detecting, by the hypervisor, a modification corresponding to a migrated memory page; and
after the detecting, assigning the first status to the migrated memory page.

4. The method of claim 1, further comprising:
detecting, by the guest, a pending modification to a migrated memory page; and
delaying an operation corresponding to the migrated memory page.

5. The method of claim 4, wherein delaying comprises exiting from the guest to the hypervisor.

6. The method of claim 4, wherein the delaying includes at least one delay selected from the group consisting of: (1)

a user-configured delay; and (2) a delay that is based on memory page migration speed.

7. The method of claim 4, wherein the operation includes at least one operation selected from the group consisting of: (1) allocating the migrated memory page; and (2) writing to the migrated memory page.

8. The method of claim 1, wherein the data structure is a bitmap that includes at least one bit corresponding to a migration status of each memory page of the plurality of guest memory pages, wherein the first status is assigned by including a first data value in the bitmap, wherein the second status is assigned by including a second data value in the bitmap.

9. A computer program product stored on a non-transitory computer-readable medium, the computer program product comprising machine readable instructions that when executed by one or more processors cause the one or more processors to:
  run a virtual machine by a hypervisor, the virtual machine including a guest that is allocated a plurality of guest memory pages;
  initialize a data structure corresponding to a memory page of the plurality of guest memory pages;
  assign, in the data structure, a first status to the memory page, wherein the first status indicates that the memory page includes data that has not been migrated;
  migrate the memory page; and
  assign, in the data structure, a second status to the memory page, wherein the second status indicates that the memory page has been migrated and has not been modified since the migration;
  receiving a notification that a migration has started;
  determining that at least one memory page of the plurality of guest memory pages is to be modified, wherein the determining is triggered by a request to write data to the at least one memory page;
  in response to determining that the at least one memory page of the plurality of guest memory pages has the first status indicating that the at least one memory page of the plurality of guest memory pages has not been migrated, modifying the at least one memory page of the plurality of guest memory pages that has the first status, wherein the determining is based on a size of data that is to be written into the plurality of guest memory pages; and
  notifying the guest via a signal that the data structure has been modified.

10. The medium of claim 9, wherein the data structure is readable by the guest and writable by the hypervisor.

11. The medium of claim 9, the one or more processors further to:
  detect, by the hypervisor, a modification corresponding to the memory page while the memory page is assigned the second status; and
  based on the detecting, assign the first status to the memory page.

12. The medium of claim 9, the one or more processors to further to:
  allocate, by the guest, one or more memory pages of the plurality of guest memory pages that are assigned the first status; and
  modify the one or more memory pages.

13. The medium of claim 9, the one or more processors to further to:
  detect, by the guest, a pending modification to a migrated memory page; and
  delay allocation of the migrated memory page.

14. A system, the system comprising:
  a processor and a memory;
  a data structure stored in the memory, the data structure indicating migration status corresponding to a memory page of a plurality of guest memory pages;
  a hypervisor executed by the processor, the hypervisor to:
    run a virtual machine, the virtual machine including a guest that is allocated the plurality of guest memory pages,
    assign, in the data structure, a first status to the memory page, wherein the first status indicates that the memory page has not been migrated;
    migrate the memory page;
    assign, in the data structure, a second status to the memory page, wherein the second status indicates that the memory page has been migrated and has not been modified since the migration;
    receive a notification that a migration has started;
    determine that at least one memory page of the plurality of guest memory pages is to be modified, wherein the determining is triggered by a request to write data to the at least one memory page;
    in response to determining that the at least one memory page of the plurality of guest memory pages has the first status that indicates that the at least one memory page of the plurality of guest memory pages has not been migrated, modify the at least one memory page of the plurality of guest memory pages that has the first status, wherein the determining is based on a size of data that is to be written into the plurality of guest memory pages; and
    notifying the guest via a signal that the data structure has been modified.

15. The system of claim 14, wherein the data structure is readable by the guest and writable by the hypervisor.

16. The system of claim 14, the hypervisor further to:
  detect a modification corresponding to the memory page while the memory page is assigned the second status; and
  based on the detecting, assign the first status to the memory page.

17. The system of claim 14, the guest further to:
  select one or more memory pages of the plurality of guest memory pages from a pool of guest memory pages that are assigned the first status; and
  modify the one or more memory pages.

* * * * *